(12) United States Patent
Furuichi et al.

(10) Patent No.: US 8,902,723 B2
(45) Date of Patent: Dec. 2, 2014

(54) FIXING STRUCTURE OF OPTICAL COMPONENT, FIXING METHOD OF OPTICAL COMPONENT, OPTICAL PICK-UP DEVICE, AND MODULE DEVICE WITH LIGHT SOURCES OF RGB THREE PRIMARY COLORS

(71) Applicant: Hitachi Media Electronics Co., Ltd., Yokohama, Kanagawa (JP)

(72) Inventors: Hiroaki Furuichi, Tokyo (JP); Yasuo Amano, Tokyo (JP); Teppei Tanaka, Yokohama (JP); Hitoshi Sugawara, Yokohama (JP); Masahiko Kamesawa, Yokohama (JP)

(73) Assignee: Hitachi Media Electronics Co., Ltd., Kanagawa (JP)

( * ) Notice: Subject to any disclaimer, the term of this patent is extended or adjusted under 35 U.S.C. 154(b) by 0 days.

(21) Appl. No.: 14/086,048

(22) Filed: Nov. 21, 2013

(65) Prior Publication Data

US 2014/0226452 A1 Aug. 14, 2014

(30) Foreign Application Priority Data

Feb. 13, 2013 (JP) ................................. 2013-025391

(51) Int. Cl.
G11B 7/12 (2012.01)
F16B 47/00 (2006.01)
G11B 7/08 (2006.01)

(52) U.S. Cl.
CPC ................ *F16B 47/003* (2013.01); *G11B 7/08* (2013.01)
USPC ....................................... 369/244.1; 720/689

(58) Field of Classification Search
USPC ............ 369/44.14, 244.1; 359/390; 720/689, 720/605, 691
See application file for complete search history.

(56) References Cited

U.S. PATENT DOCUMENTS

| | | | | |
|---|---|---|---|---|
| 5,507,082 A | * | 4/1996 | Goda | 29/407.1 |
| 6,452,754 B1 | * | 9/2002 | Mizuta et al. | 360/266.3 |
| 8,169,875 B2 | * | 5/2012 | Furuichi et al. | 369/100 |
| 8,737,186 B2 | * | 5/2014 | Nakagawa | 369/244.1 |
| 2004/0257927 A1 | * | 12/2004 | Sogawa et al. | 369/44.14 |
| 2007/0206450 A1 | * | 9/2007 | Nakagawa | 369/44.15 |
| 2007/0211582 A1 | * | 9/2007 | Suetsugu | 369/44.11 |
| 2008/0298217 A1 | * | 12/2008 | Washiyama | 369/121 |
| 2009/0055851 A1 | * | 2/2009 | Tanaka et al. | 720/695 |

FOREIGN PATENT DOCUMENTS

JP 2005-32314 A 2/2005
WO WO 2006/118037 A1 11/2006

* cited by examiner

*Primary Examiner* — Thomas Alunkal
(74) *Attorney, Agent, or Firm* — Crowell & Moring LLP

(57) ABSTRACT

A fixing structure of an optical component is composed of a device chassis; a holder holding an optical component; first and second plate parts for joint to the device chassis and a connecting part of both the plate parts are formed in the holder; a plurality of joint holes are formed in the second plate part; a U-groove into which the connecting part of the holder is fitted and a plurality of through-holes are formed in the device chassis; and an adhesive that is extended in a circular columnar shape and is made by inserting the holder into the U-groove of the device chassis, and applying a UV-curing adhesive in such a manner that the UV-curing adhesive is bonded to the first plate part of the holder and is continuous to the inside of the joint hole via the inside of the through-hole, and radiating UV light along the through-hole.

17 Claims, 7 Drawing Sheets

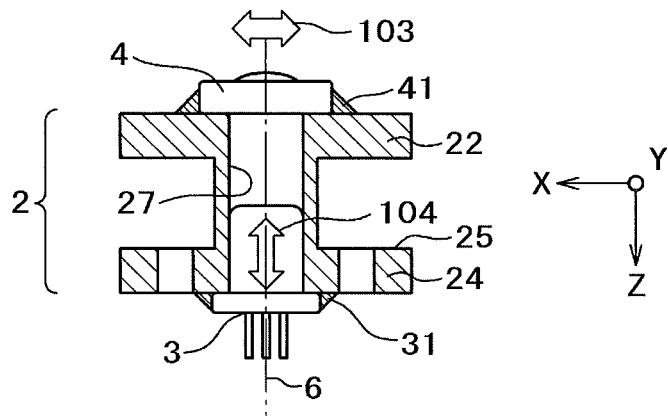
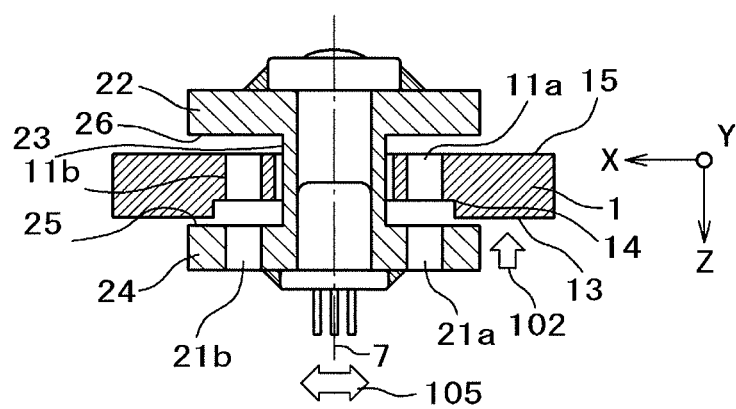
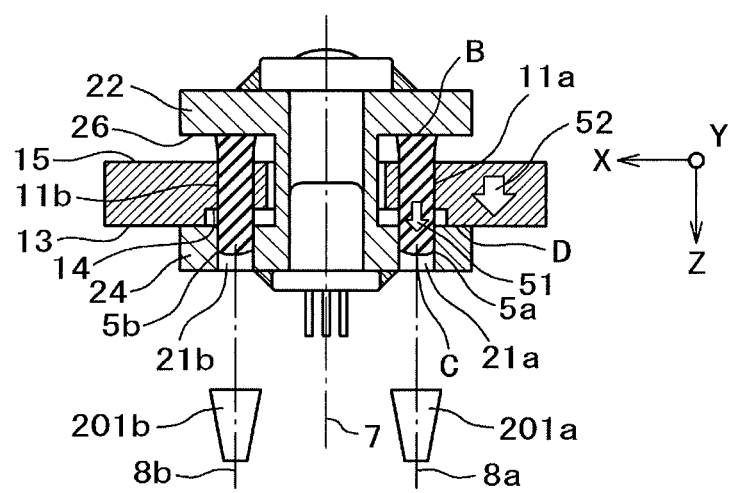

FIXING STRUCTURE OF OPTICAL COMPONENT, FIXING METHOD OF OPTICAL COMPONENT, OPTICAL PICK-UP DEVICE, AND MODULE DEVICE WITH LIGHT SOURCES OF RGB THREE PRIMARY COLORS

CLAIM OF PRIORITY

The present application claims priority from Japanese application serial no. JP2013-025391, filed on Feb. 13, 2013, the content of which is hereby incorporated by reference into this application.

BACKGROUND OF THE INVENTION

1. Field of the Invention

The present invention relates to an optical pick-up device used for recording and reproduction of an optical disc such as compact disc (CD), digital versatile disc (DVD), and Blu-ray Disc (BD), an optical disc drive device incorporating the optical pick-up device, a module device with light sources of RGB three primary colors used for a laser display, a projector device incorporating the module device, and so forth, and particularly to a technique for bonding and fixing an optical component typified by a laser diode (hereinafter, LD), a light receiving element, etc.

2. Description of the Related Art

As a background art of the present technical field, International Patent Publication WO 2006/118037 A1 (patent document 1) exists. This bulletin discloses a "feature that sufficient fixing strength can be obtained even with only a curing resin against external factors such as a dropping impact and heat generated from a light source can be efficiently released to an optical base by forming a convex part on the top surface of the optical base on which the light source is disposed and applying the curing resin into a gap between a holder to hold the light source and the convex part on the optical base".

Furthermore, JP-A-2005-32314 (patent document 2) exists. This bulletin discloses a "feature that the necessary amount of UV (ultraviolet) irradiation can be given and a position shift can also be suppressed by suppression of flow deformation in adhesive curing by using an adhesive in which inorganic compound powders allowing transmission of UV therethrough are mixed in a method in which a gap for position adjustment is set between a holding member to hold a light emitting element or a light receiving element and an optical chassis and a UV-curing resin adhesive is applied into this gap to fix the holding member".

SUMMARY OF THE INVENTION

According to the above-described patent document 1, by applying the curing resin into the gap between the holder and the convex part on the optical base, a large contact area of the adhesive is obtained to enhance the bonding strength, and the heat release performance is improved. However, this patent document 1 does not include a description about a special approach to suppress an anteroposterior and lateral position shift on the submicron order due to slight variation in the amount of adhesive application into the respective gaps.

According to the above-described patent document 2, by using the adhesive in which the inorganic compound powders allowing transmission of UV are mixed, the UV irradiation amount is ensured and a position shift in curing of the adhesive itself can be suppressed. However, this patent document 2 does not include a description about a special approach regarding a method for preventing a position shift due to expansion and contraction of the adhesive itself at the time of temperature change.

So, the present invention is to provide a fixing structure of an optical component and a fixing method of an optical component that prevent a position shift on the submicron order and also improve the heat release performance by utilizing expansion and contraction of an adhesive itself due to temperature change to always make a chassis and the component be contact with each other at specific surfaces through assembling and reliability test so that compatibility can be obtained even for recent products with a strict allowance of the position shift. Furthermore, the present invention is to provide a fixing structure of an optical component and a fixing method of an optical component that eliminate the need for a pressing component formed of a spring or the like.

To solve the above-described problems, an aspect of the present invention provides a fixing structure of an optical component for fixing an optical component to a device chassis. The fixing structure includes a device chassis on which the optical component is mounted and a holder holding the optical component that has an optical axis aligned to form a predetermined angle with a holder reference surface and is bonding-fixed by a resin. A first plate part and a second plate part for joint to the device chassis and a connecting part that connects the first plate part to the second plate part are formed in the holder. A plurality of joint holes are formed in the second plate part. A U-groove into which the connecting part of the holder is fitted and a plurality of through-holes around the U-groove are formed in a joint part of the device chassis. The fixing structure further includes an adhesive that is extended in a circular columnar shape and is made by inserting the connecting part of the holder into the U-groove of the joint part of the device chassis, and positioning the device chassis and the holder in such a manner that the joint holes of the second plate part are opposed to the through-holes of the device chassis, and applying a UV-curing adhesive in such a manner that the UV-curing adhesive is bonded to the first plate part of the holder and is continuous to the inside of the joint hole via the inside of the through-hole, and radiating UV light along the center of the through-hole to cure the UV-curing adhesive.

Furthermore, to solve the above-described problems, another aspect of the present invention provides another fixing structure of an optical component for fixing an optical component to a device chassis. The fixing structure includes a device chassis on which the optical component is mounted and a holder holding the optical component that has an optical axis aligned to form a predetermined angle with a holder reference surface and is bonding-fixed by a resin. A first plate part and a second plate part for joint to the device chassis and a connecting part that connects the first plate part to the second plate part are formed in the holder. A plurality of joint holes are formed in the second plate part. A center U-groove into which the connecting part of the holder is fitted and a plurality of penetrating U-grooves around the center U-groove are formed in a joint part of the device chassis. The fixing structure further includes an adhesive that is extended in a columnar shape and is made by inserting the connecting part of the holder into the center U-groove of the joint part of the device chassis, and positioning the device chassis and the holder in such a manner that the joint holes of the second plate part are opposed to the penetrating U-grooves of the device chassis, and applying a UV-curing adhesive in such a manner that the UV-curing adhesive is bonded to the first plate part of the holder and is continuous to the inside of the joint hole via the inside of the penetrating U-groove, and radiating UV light along the center of the penetrating U-groove to cure the UV-curing adhesive.

Moreover, to solve the above-described problems, another aspect of the present invention provides a fixing method of an optical component for fixing an optical component to a device chassis. The fixing method includes aligning the optical axis of the optical component relative to a holder in which a first plate part and a second plate part for joint to the device chassis and a connecting part that connects the first plate part to the second plate part are formed and a plurality of joint holes are formed in the second plate part so that the optical axis may form a predetermined angle with a holder reference surface, and bonding-fixing the optical component by a resin. The fixing method further includes inserting the connecting part of the holder into a U-groove formed in a joint part of the device chassis and positioning the device chassis and the holder in such a manner that the joint holes of the second plate part are opposed to a plurality of through-holes formed around the U-groove of the device chassis. The fixing method further includes applying a UV-curing adhesive in such a manner that the UV-curing adhesive is bonded to the first plate part of the holder and is continuous to the inside of the joint hole via the inside of the through-hole, and radiating UV light from the outside of the joint hole along the center of the through-hole to cure the UV-curing adhesive.

According to the present invention, in the case of bonding-fixing the holder holding an LD or a light receiving element and a lens to the chassis with the intermediary of the UV-curing adhesive, the UV-curing adhesive is packed from the through-hole of the joint plate part of the holder to a joint plate surface of the holder perpendicular to the optical axis via the through-hole of the chassis, and UV irradiation is performed via the through-hole of the joint plate part of the holder to cure and bond the UV-curing adhesive. Thus, in assembling with UV curing, UV curing contraction force is generated from the side of the through-hole of the holder, which is closer to the UV light source, and the chassis and the holder are brought into tight contact with each other. Furthermore, at the time of high temperature and low temperature in a reliability test, the tight contact between the chassis and the holder can be kept by utilizing thermal expansion and contraction of the UV-curing adhesive. Therefore, there is an effect that a position shift on the submicron order can be prevented also in a temperature cycle test in addition to the above-described assembling.

Furthermore, the chassis and the holder can be in contact with each other at specific surfaces invariably through the assembling and reliability test (temperature cycle). Therefore, enhancement in the heat release performance can also be achieved in addition to prevention of a position shift. Moreover, because only the adhesive is used as the constituent element other than the chassis and the holder, a pressing component formed of a spring or the like is unnecessary. Thus, there is also an effect that the number of components is decreased and the material cost, the assembling cost, and so forth are reduced.

BRIEF DESCRIPTION OF THE DRAWINGS

FIGS. 3(a) to 3(c) are sectional views for explaining the assembling steps of the fixing structure of an optical component according to the first embodiment of the present invention.

DESCRIPTION OF THE PREFERRED EMBODIMENTS

Embodiments of the present invention will be described below by using the drawings.

First Embodiment

Figure 1:
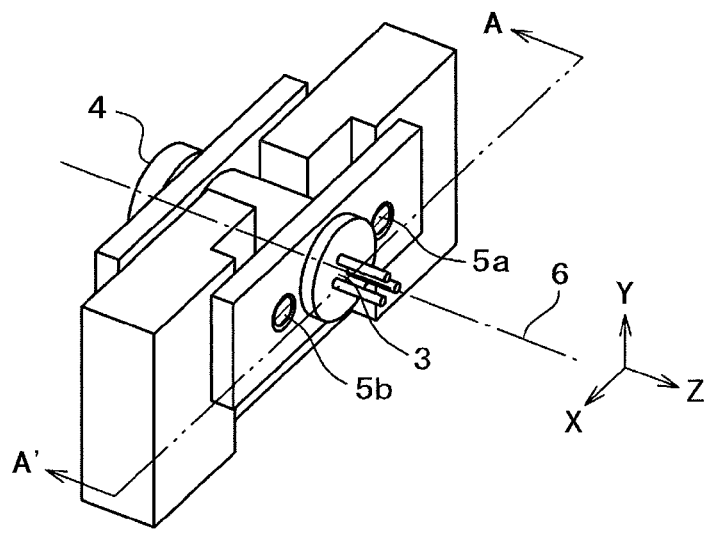
FIG. 1 is a perspective view showing a fixing structure of an optical component according to a first embodiment of the present invention.
Figure 2:
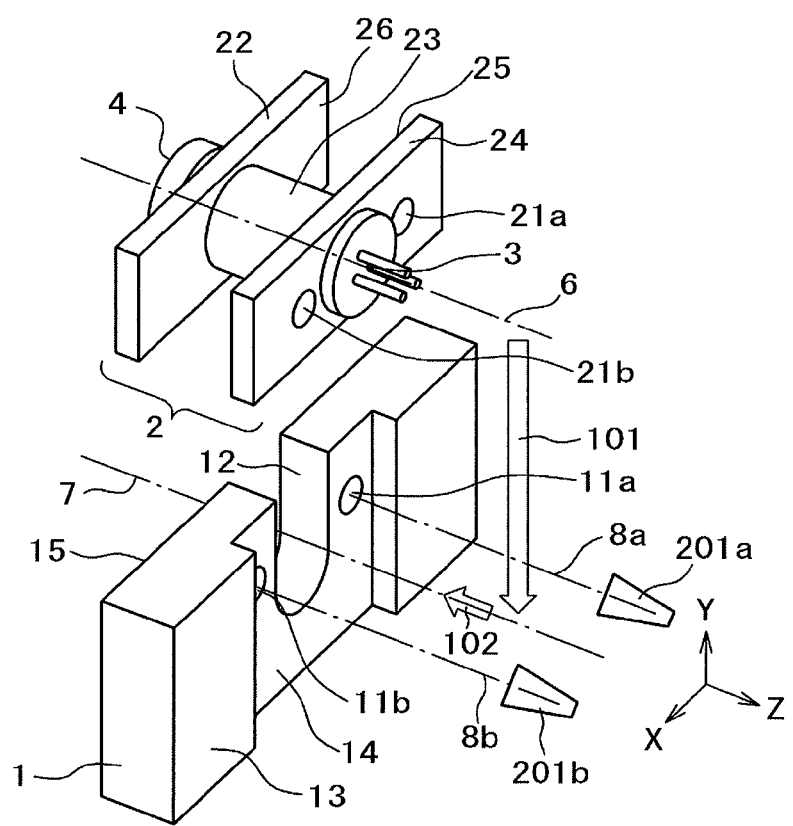
FIG. 2 is an exploded perspective view for explaining assembling steps of the fixing structure of an optical component according to the first embodiment of the present invention.

First, a first embodiment of the present invention will be described. FIG. 1 is a perspective view showing a state in which a sub-assembly 2 made by assembling optical components 3 and 4 to which the first embodiment of the present invention is applied with a holder 2 into a module unit in advance is assembled and bonding-fixed to the relevant part of a chassis 1 of a device using these optical components. FIG. 2 is a perspective view showing schematic assembling steps to assemble the sub-assembly 2 that holds the optical components in FIG. 1 to the chassis 1 of the device using these optical components. FIGS. 3(a), 3(b), and 3(c) are sectional views of each of the assembling steps of FIG. 2.

As shown in FIG. 1, a fixing structure of the optical component according to the present embodiment is composed mainly of the chassis 1, the holder (sub-assembly) 2 to which the LD 3 and the lens 4 are fixed, and UV-curing adhesives 5a and 5b that bonding-fix them with adjustment of the position of a holder-side optical axis 6. The chassis 1 shown here is part of a chassis to which laser diodes, light receiving elements, etc. of an optical pick-up device used for recording and reproduction of an optical disc or a module device with light sources of RGB three primary colors used for a laser display are bonding-fixed. The configurations of the whole of these devices are shown in FIG. 7 and FIG. 8.

Figure 7:
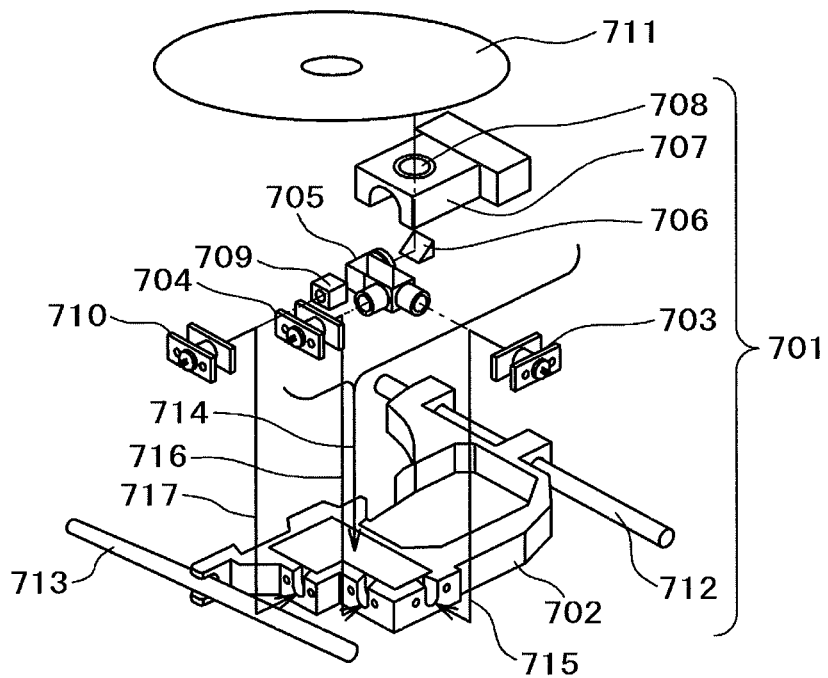
FIG. 7 is an exploded perspective view showing an optical pick-up device to which the first embodiment of the present invention is applied.
Figure 8:
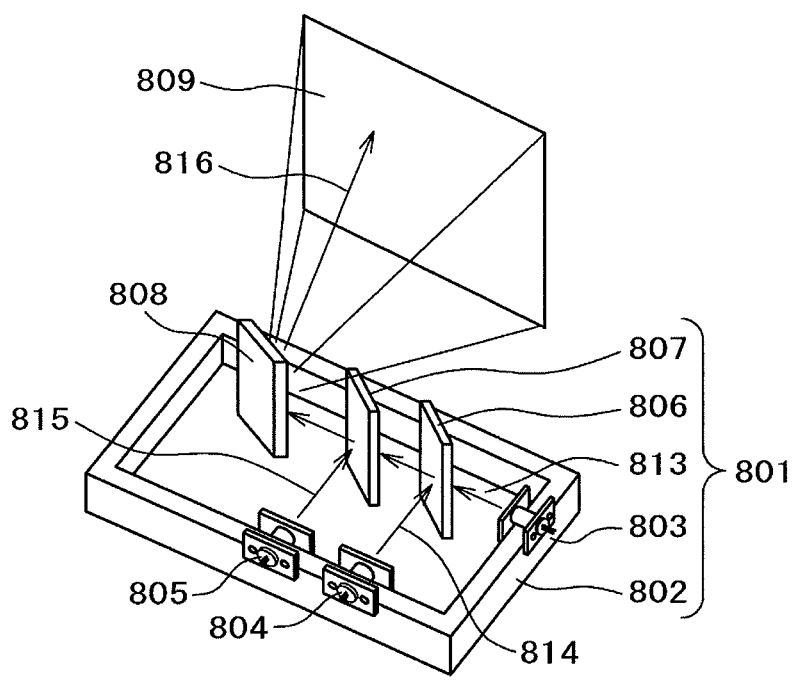
FIG. 8 is a perspective view showing a module device with light sources of RGB three primary colors to which the first embodiment of the present invention is applied.

FIG. 7 is an exploded perspective view for explaining constituent parts and assembling method of an optical pick-up device 701 to which the first embodiment of the present invention is applied. The optical pick-up device 701 of the present embodiment has an optical pick-up case (chassis) 702, a first LD module 703 (equivalent to the sub-assembly 2 holding the optical components 3 and 4 in FIG. 1), a second LD module 704 (equivalent to the sub-assembly 2 holding the optical components 3 and 4 in FIG. 1), a prism 705, a reflective mirror 706, an actuator 707, an objective lens 708, a lens 709, and a light receiving element module 710.

In the optical pick-up device 701 with the above-described configuration, emitted light beams from the first LD module 703 and the second LD module 704 are combined or reflected by the prism 705 and the resulting light is guided to the objective lens 708 disposed on the actuator 707 via the reflective mirror 706 to be focused into a spot on an optical disc 711. Reflected light from the optical disc 711 is guided to the light receiving element 710 via the objective lens 708, the reflective mirror 706, the prism 705, and the lens 709.

To realize this optical system, internal components such as the actuator 707, the reflective mirror 706, the prism 705, and the lens 709 are mounted to the optical pick-up case 702 in an assembling direction 714. Thereafter, the first LD module 703, the second LD module 704, and the light receiving element module 710 are bonding-fixed after position adjustment in an assembling direction 715, an assembling direction 716, and an assembling direction 717, respectively. The optical pick-up device 701 itself is so configured as to move in the radial direction of a rotating optical disc by a main shaft 712 and a sub-shaft 713 and be capable of reading and writing an optical signal.

FIG. 8 is a perspective view for explaining constituent parts and assembling method of a module device 801 with light sources of RGB three primary colors to which the first embodiment of the present invention is applied. The module device 801 with light sources of RGB three primary colors according to the present embodiment has an RGB module case (chassis) 802, a green LD module 803 (equivalent to the sub-assembly 2 holding the optical components 3 and 4 in FIG. 1), a red LD module 804 (equivalent to the sub-assembly 2 holding the optical components 3 and 4 in FIG. 1), a blue LD module 805 (equivalent to the sub-assembly 2 holding the optical components 3 and 4 in FIG. 1), a first combining mirror 806, a second combining mirror 807, and a bidirectional tilting mirror 808.

In the module device 801 with light sources of RGB three primary colors having the above-described configuration, green emitted light 813 from the LD module 803 and red emitted light 814 from the LD module 804 are combined by the first combining mirror 806, and the resulting combined light and blue emitted light 815 from the LD module 805 become a beam resulting from combining by the second combining mirror 807. Then, a three-color RGB combined beam 816 is two-dimensionally scanned on a screen 809 by the bidirectional tilting mirror 808 to project an image.

To build the above-described optical system, bonding-fixed to the RGB module case 802 after position adjustment are, the green LD module 803, the red LD module 804, the blue LD module 805, the first combining mirror 806, the second combining mirror 807, and the bidirectional tilting mirror 808.

For the fixing structure of the optical component in FIG. 1 used for these devices, as shown in FIG. 2, the LD 3 and the lens 4 are sub-assembled to the holder 2 in such a manner that laser light is emitted in the direction of the holder-side optical axis 6 (Z-axis negative direction). Next, the holder 2 is dropped in the Y-axis negative direction by holder Y-axis movement 101 in such a manner that a holder connector 23 is inserted into a chassis center U-groove 12 of the chassis 1. Furthermore, the holder 2 is horizontally moved in the Z-axis negative direction by holder Z-axis movement 102 so that a holder reference surface 25 may get contact with a chassis reference surface 13. Then, a needle of an adhesive applying device (not shown) is inserted from holder holes 21a and 21b and the UV-curing adhesives 5a and 5b are applied via chassis through-holes 11a and 11b. At last, UV light is radiated along chassis through-hole centers 8a and 8b by using UV light sources 201a and 201b to cure and fix the UV-curing adhesives 5a and 5b.

An adjustment method of the optical axis and the fixing structure of the optical component will be described in detail by using FIG. 3. FIG. 3 is sectional views for each of steps to assemble the fixing structure of the optical component and is obtained by cutting along an A-A' cut plane including the holder-side optical axis 6 in its plane in the perspective view of the fixing structure of the optical component in FIG. 1.

First, the sub-assembly 2 for the lens-equipped LD will be described with FIG. 3(a). The holder 2 has a structure obtained by connecting a holder front plate 22 and a holder back plate 24 by the cylindrical holder connector 23. In the holder connector 23, a holder center hole 27 for insertion of the light emitting part of the LD 3 therein and passage of an emitted laser beam therethrough is opened.

The light emitting part of the LD 3 is inserted in the holder center hole 27 of the holder 2 and simultaneously the lens 4 is placed on the front surface of the holder front plate 22 in such a manner that it can be positioned and adjusted by using a positioning stage or the like (not shown). The LD 3 set to the emission state through electrical connection (not shown) to the electrodes of the LD 3 is anteroposteriorly adjusted in the Z-axis positive and negative directions by Z-alignment 104, and the position thereof is so decided that a beam emitted from the lens 4 is a collimated beam or has a desired focal length. Then, a UV-curing adhesive 31 is applied on the LD 3 to be cured and fixed by UV irradiation (not shown). Thereafter, the lens 4 is aligned and positioned in the positive and negative directions of the X-axis and the Y-axis by XY-alignment 103, and the beam angle is adjusted so that the axis of the beam emitted from the lens 4 may correspond with the holder-side optical axis 6 perpendicular to the holder reference surface 25. Then, a UV-curing adhesive 41 is applied on the lens 4 to be cured and fixed by UV irradiation (not shown), so that the sub-assembly of the holder 2 to which the LD 3 and the lens 4 are bonded is completed. Although the configuration in which the LD and the lens are bonded to the holder 2 is shown here, this assembling procedure can be similarly applied also to a configuration in which a light receiving element and a lens are bonded to a holder.

Next, assembling of the sub-assembly 2 for the lens-equipped LD to the chassis 1 will be described with FIG. 3(b). FIG. 3(b) is a sectional view showing a state in which the holder connector 23 is vertically dropped and inserted into the chassis center U-groove 12 of the chassis 1 by the holder Y-axis movement 101 in FIG. 2. First, the holder holes 21a and 21b are disposed opposed to the chassis through-holes 11a and 11b, respectively. Next, in such a manner that a holder front plate surface 26 of the holder front plate 22 is prevented from getting contact with a chassis outer surface 15 of the chassis 1 and the chassis reference surface 13 of the chassis 1 is prevented from getting contact with the holder reference surface 25 of the holder back plate 24, the sub-assembly of the assembled holder 2 is aligned and positioned relative to a chassis-side optical axis 7 of the chassis 1 in the positive and negative directions of the X-axis and the Y-axis by XY-alignment 105 to adjust the position of the beam emitted from the lens 4. The chassis-side optical axis 7 is an ideal optical axis with which the optical component should be mounted on the chassis. The chassis-side optical axis 7 cannot be decided by considering only the chassis and is decided by tentatively positioning the actually-lighted LD and other optical components on the chassis and adjusting the positioning to satisfy the optical input/output relationship.

Figure 4A:
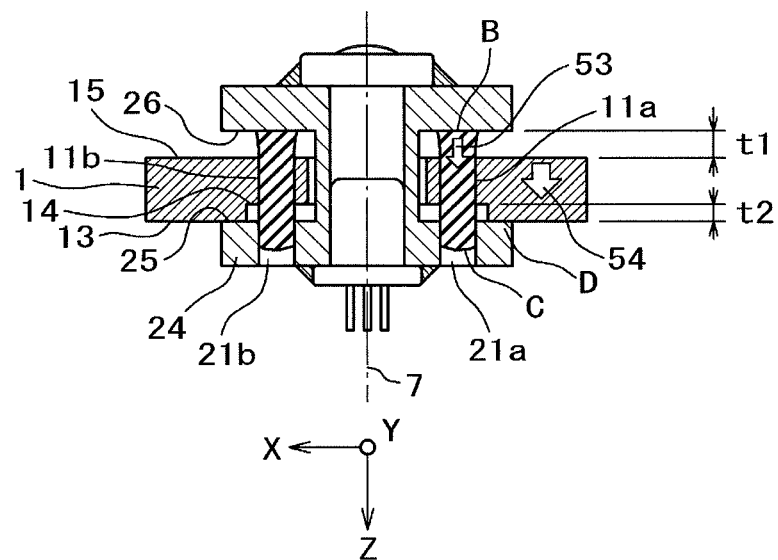
FIGS. 4(a) and 4(b) are sectional views for explaining the states of the fixing structure of an optical component according to the first embodiment of the present invention at the time of temperature change.

At last, application and curing of the adhesive will be described with FIGS. 3(b) and 3(c). First, the holder 2 is moved in the Z-axis negative direction by the holder Z-axis movement 102 so that the holder reference surface 25 may get contact with the chassis reference surface 13. A surface in which the chassis through-holes 11a and 11b of the chassis are opened (chassis inner surface 14) is so formed as to make a step from the chassis reference surface 13 as if the chassis reference surface 13 is dug down in the Z-axis negative direction. When the holder reference surface 25 is brought into contact with the chassis reference surface 13, as shown in FIG. 4(a), gaps whose thickness is t2 are formed between the chassis through-holes 11a and 11b and the holder holes 21a and 21b.

Then, the tip of the needle of the adhesive applying device (not shown) is inserted in the Z-axis negative direction from the holder holes 21a and 21b made in the holder back plate 24 to the vicinity of the holder front plate surface 26 of the holder front plate 22 via the chassis through-holes 11a and 11b made in the chassis 1. Then, the UV-curing adhesives 5a and 5b are applied while the needle is drawn out in the Z-axis positive direction, and the application is completed at the timing when they are applied to a position of substantially the half of the holder holes 21a and 21b made in the holder back plate 24.

The UV-curing adhesives 5a and 5b applied from the needle tip of the adhesive applying device first abut on the holder front plate surface 26 of the holder front plate 22. Furthermore, a gap is formed between the holder front plate surface 26 and the chassis outer surface of the chassis 1. However, the UV-curing adhesive has viscosity and is closer to a gel than a liquid. Therefore, by properly adjusting the speed at which the UV-curing adhesives 5a and 5b are applied while the needle is drawn out in the Z-axis positive direction, the UV-curing adhesives 5a and 5b that are bonded to the holder front plate surface 26 and have a circular columnar shape are formed with almost zero amount of adhesive leaking out to this gap.

At last, UV light is radiated along the chassis through-hole centers 8a and 8b by using the UV light sources 201a and 201b to cure and fix the UV-curing adhesives 5a and 5b.

Here, the relationship between the chassis 1 and the holder 2 at the time of the UV curing will be described. In general, the volume of the UV-curing adhesive contracts on the order of several percentage points in UV curing from a liquid to a solid. In the UV-curing adhesives 5a and 5b packed in the holder holes 21a and 21b made in the holder back plate 24, UV curing starts from an open end C, which is closer to the UV light sources 201a and 201b. Then, the UV curing proceeds in the chassis through-holes 11a and 11b along the chassis through-hole centers 8a and 8b, so that the side of a fixed end B on the holder front plate surface 26 of the holder front plate 22 is UV-cured at last. Therefore, UV curing contraction force 51 is generated due to the UV curing contraction from the side of the open end C and thus chassis pressing force 52 toward the holder back plate 24 acts on the chassis 1. Accordingly, the chassis reference surface 13 and the holder reference surface 25 are brought into tight contact with each other at contact surfaces D. From the above, in assembling, the chassis 1 and the holder 2 can be brought into tight contact with each other by utilizing the UV curing contraction of the UV-curing adhesives 5a and 5b, and there is an effect that a position shift on the submicron order can be prevented at the initial stage of the assembling.

Next, the reason why the fixing structure of the optical component according to the present embodiment will have an effect to prevent a position shift on the submicron order even in a use environment with a temperature cycle will be described by explaining the relationship between the chassis 1 and the holder 2 on the assumption of a reliability test by using FIG. 4. In general, the thermal expansion coefficient of the adhesive is larger than that of parts of metal, glass, and so forth and a position shift of components easily occurs due to this. Therefore, a situation in a temperature cycle test, in which thermal expansion and contraction of the adhesive itself repeatedly occur, is assumed.

First, FIG. 4(a) shows a state of a high temperature of e.g. about 70° C. to 90° C. When the temperature is high, the volume of the whole of the UV-curing adhesives 5a and 5b expands. However, regarding the Z-axis negative direction, the expansion is restrained by the fixed end B on the holder front plate surface 26 and furthermore is restrained also by the chassis through-holes 11a and 11b and the holder holes 21a and 21b. Thus, the volume expands in the Z-axis positive direction. Furthermore, generally the adhesive softens at a high temperature and its elastic modulus (Young's modulus) decreases. Thus, the adhesives 5a and 5b expand from the side of the fixed end B and the surface of the softened adhesive on the side of the open end C also deforms in the Z-axis positive direction. Therefore, the adhesives themselves expand in volume to cause expansion force 53 from the side of the fixed end B toward the side of the open end C, and chassis pressing force 54 is generated in the Z-axis positive direction. As a result, continuously from the time of assembling in FIG. 3(c), the chassis pressing force 52 toward the holder back plate 24 acts on the chassis 1, and the chassis reference surface 13 and the holder reference surface 25 are brought into tight contact with each other at the contact surfaces D. Here, on one and the other sides of the chassis through-holes 11a and 11b of the chassis 1, the length of the adhesive on the Z-axis negative side between the fixed end B on the holder front plate surface 26 and the chassis outer surface 15 is defined as t1, and the length of the adhesive on the Z-axis positive side between the chassis inner surface 14 and the holder reference surface 25 of the holder back plate 24 is defined as t2. For example, t1=0.8 mm and t2=0.5 mm are assumed.

If the following (Expression 1) is satisfied, the chassis 1 can be pressed in the Z-axis positive direction to be surely brought into tight contact with the holder 2. Therefore, it is more preferable to set an arrangement satisfying this relationship.

$$t2<t1 \quad \text{(Expression 1)}$$

Figure 4B:
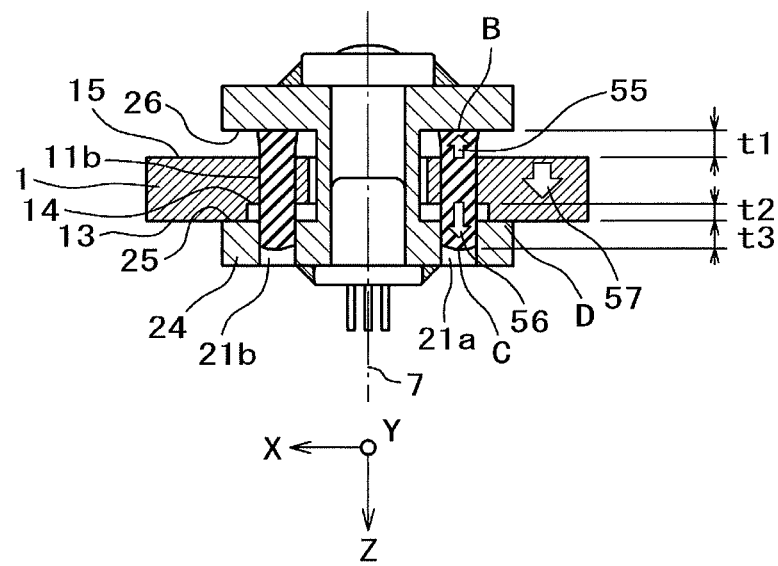

Meanwhile, FIG. 4(b) shows a state of a low temperature of e.g. about −40° C. to −20° C. When the temperature is low, the volume of the whole of the UV-curing adhesives 5a and 5b contracts. Here, on one and the other sides of the chassis through-holes 11a and 11b of the chassis 1, the length of the adhesive on the Z-axis negative side between the fixed end B on the holder front plate surface 26 and the chassis outer surface 15 is defined as t1, and the length of the adhesive on the Z-axis positive side between the chassis inner surface 14 and the open end C in the holder holes 21a and 21b of the holder back plate 24 is defined as t2+t3.

If the following (Expression 2) is satisfied, C-side contraction force 56 generated at the part of t2+t3 is larger than B-side contraction force 55 generated at the part of t1, and chassis pressing force 57 in the Z-axis positive direction is generated. As a result, continuously from the time of assembling in FIG. 3(c), the chassis pressing force 52 toward the holder back plate 24 acts on the chassis 1, and the chassis reference surface 13 and the holder reference surface 25 are brought into tight contact with each other at the contact surfaces D.

From the above, at the time of high temperature and low temperature, the tight contact between the chassis 1 and the holder 2 can be kept by utilizing thermal expansion and contraction of the UV-curing adhesives 5a and 5b, and there is an effect that a position shift on the submicron order can be prevented also in a temperature cycle test in addition to the above-described initial stage of assembling. Furthermore, in a high-temperature high-humidity test at e.g. 60° C. and 90%, the adhesive generally absorbs moisture to swell and therefore effects equivalent to those of the above-described behavior when the temperature is high can be expected.

Second Embodiment

Figure 5:
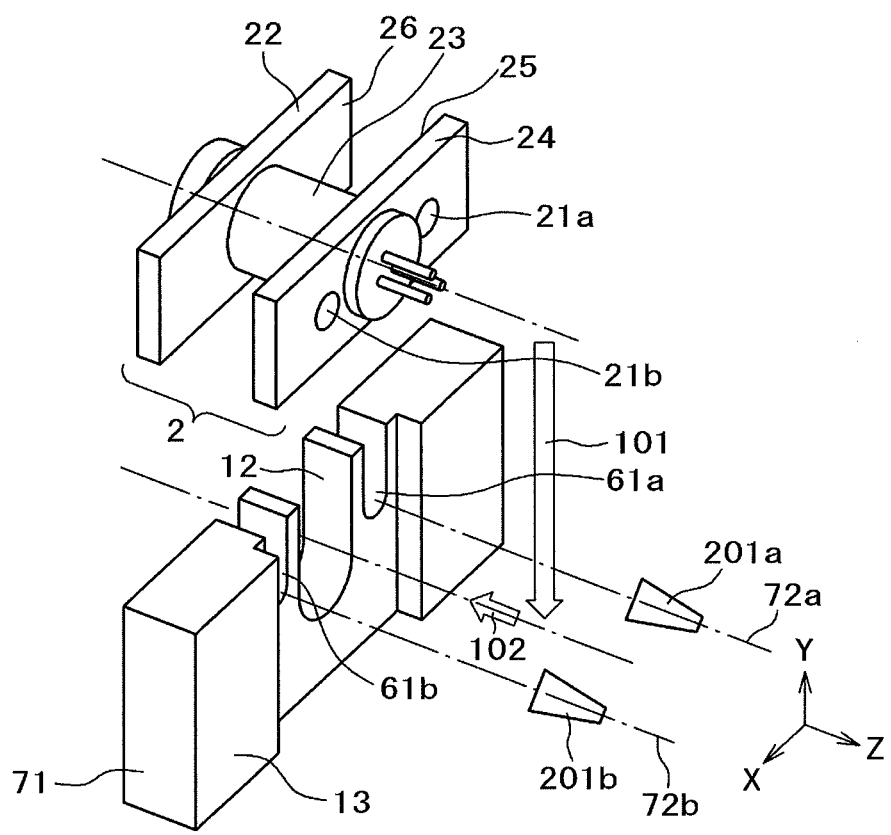
FIG. 5 is an exploded perspective view for explaining assembling steps of a fixing structure of an optical component according to a second embodiment of the present invention.

Next, a second embodiment of the present invention will be described by using FIG. 5. FIG. 5 is a perspective view showing schematic assembling steps of a fixing structure of an optical component similarly to FIG. 2 for the first embodiment. First, similarly to FIG. 2, a sub-assembly of the holder 2 equipped with the LD 3 and the lens 4 is previously assembled. Next, the holder 2 is dropped in the Y-axis negative direction by the holder Y-axis movement 101 in such a manner that the holder connector 23 is inserted into the chassis center U-groove 12 of a chassis 71. Furthermore, the holder 2 is horizontally moved in the Z-axis negative direction by the holder Z-axis movement 102 so that the holder reference surface 25 may get contact with the chassis reference surface 13. In the chassis 71, chassis penetrating U-grooves 61a and 61b are made. So, a needle of an adhesive applying device (not shown) is brought close to the holder front plate surface 26 of the holder front plate 22 from the Y-axis positive side and application is started. The application is forwarded via the chassis penetrating U-grooves 61a and 61b into the holder holes 21a and 21b made in the holder back plate 24 in the Z-axis positive direction, and to a position of substantially the half of the holder holes 21a and 21b. At this timing, the application is completed. At last, UV light is radiated along chassis penetrating U-groove centers 72a and 72b by using the UV light sources 201a and 201b to cure and fix the UV-curing adhesive.

In the present embodiment, the chassis penetrating U-grooves 61a and 61b are made in the chassis 71. This eliminates the need to insert the needle of the adhesive applying device from the holder holes 21a and 21b to the vicinity of the holder front plate surface 26 like in FIG. 2. Specifically, the needle is inserted into a space over the chassis penetrating U-grooves 61a and 61b and the adhesive is applied in the chassis penetrating U-grooves. This can replace forming the columnar adhesive. Thus, there is an effect that the application of the UV-curing adhesive becomes easy.

Third Embodiment

Figure 6A:
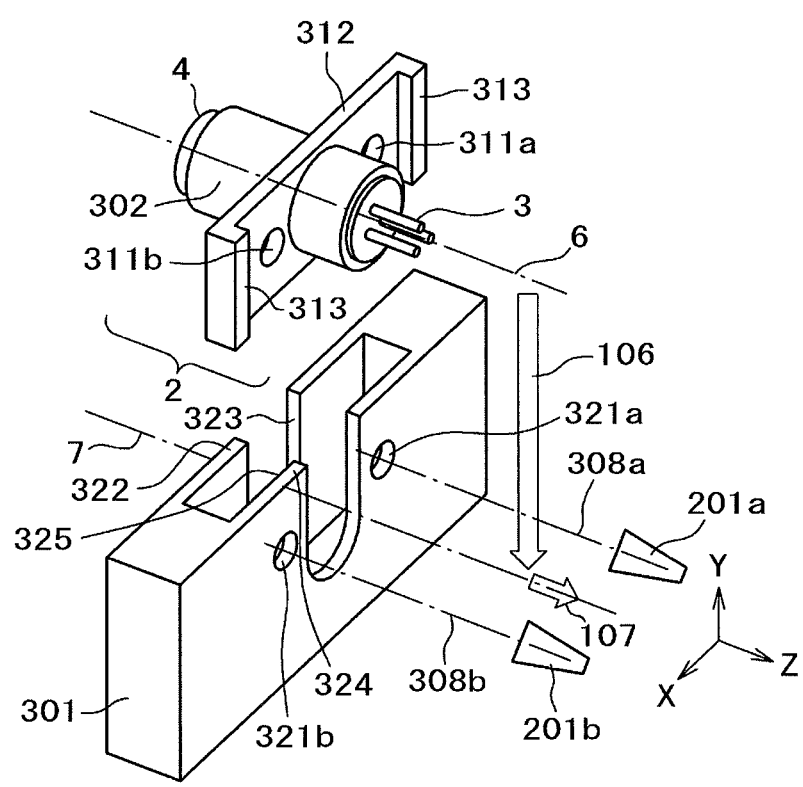
FIG. 6(a) is an exploded perspective view for explaining assembling steps of a fixing structure of an optical component according to a third embodiment of the present invention.
Figure 6B:
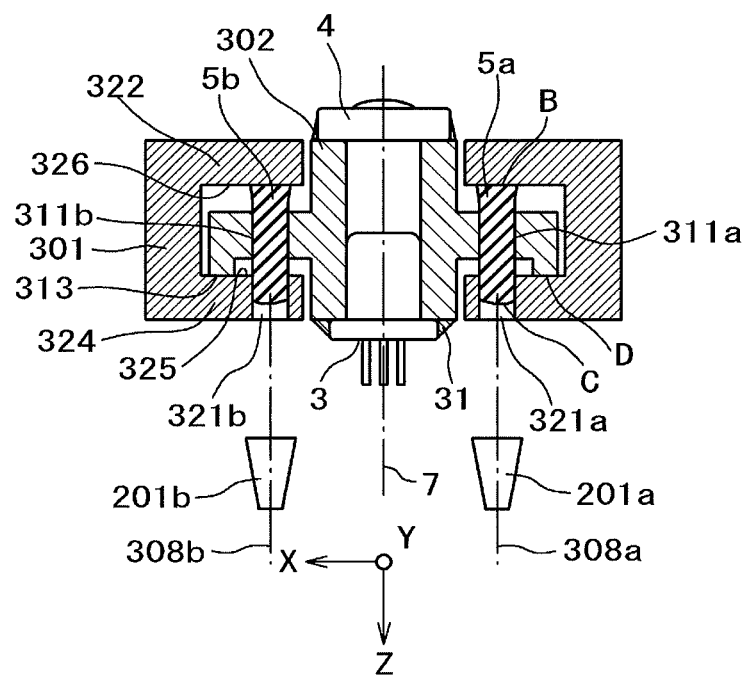
FIG. 6(b) is a sectional view for explaining the fixing structure of an optical component according to the third embodiment of the present invention.

Next, a third embodiment of the present invention will be described by using an exploded perspective view of FIG. 6(a) and a sectional view of FIG. 6(b). The relationship between joint parts of a chassis 301 and a holder 302 according to the present embodiment is as follows. Specifically, as is apparent from comparison with the exploded perspective view of FIG. 2 and the sectional view of FIG. 3(c) for the first embodiment, a chassis front plate 322 and a chassis back plate 324 of the chassis 301 are formed as the equivalent of the holder front plate 22 and the holder back plate 24, and a joint plate 312 of the holder 302 is formed as the equivalent of the part including the chassis inner surface 14, in which the chassis through-holes 11a and 11b are formed, in the chassis 1. The third embodiment is the same as the first embodiment in the principle of how to bonding-fix the joint part of the chassis side and the joint part of the holder side by an adhesive applied and cured in a columnar shape.

First, similarly to FIG. 2, the sub-assembly 2 of the holder 302 equipped with the LD 3 and the lens 4 is previously assembled. In the holder 302 of the present embodiment, the cylindrical holder main body 302 for aligning the optical axes of the LD 3 and the lens 4 and bonding-fixing them and the flange-shaped joint plate 312 serving as the joint part to the chassis 301 are formed. Holder through-holes 311a and 311b are opened in the joint plate 312.

The sub-assembly 2 of the holder 302 is inserted into a chassis center U-groove 323 formed in the chassis front plate 322 and the chassis back plate 324 (holder Y-axis movement 106) and is so disposed that the holder through-holes 311a and 311b are opposed to chassis holes 321a and 321b, respectively, formed in the chassis back plate 324. Subsequently, XY-alignment and positioning of the sub-assembly 2 of the assembled holder 302 are performed relative to the chassis-side optical axis 7 of the chassis 301 to adjust the position of the beam emitted from the lens 4.

Next, the sub-assembly 2 of the holder 302 is moved in the Z-axis positive direction by movement 107 so that a holder reference surface 313 may get contact with a chassis reference surface 325. Then, the tip of a needle of an adhesive applying device (not shown) is inserted in the Z-axis negative direction from the chassis holes 321a and 321b made in the chassis back plate 324 via the holder through-holes 311a and 311b made in the joint plate 312 of the holder 302 to the vicinity of a chassis front plate surface 326 of the chassis front plate 322. Then, the UV-curing adhesives 5a and 5b are applied while the needle is drawn out in the Z-axis positive direction. The application is completed at the timing when the adhesives are applied to a position of substantially the depth-wise half of the chassis holes 321a and 321b made in the chassis back plate 324. At last, UV light is radiated along chassis through-hole centers 308a and 308b by using the UV light sources 201a and 201b to cure and fix the UV-curing adhesives 5a and 5b.

To apply the UV-curing adhesives 5a and 5b, the holes on the side of the open end C, from which the needle of the adhesive applying device is inserted, are made on the holder side in the above-described FIGS. 1 to 5. However, in FIG. 6(b), the chassis holes 321a and 321b can be made on the chassis side and the open end C can be formed similarly. Therefore, even for the configuration of FIG. 6(b), the chassis 301 and the holder 302 can be brought into tight contact with each other in assembling by utilizing the UV curing contraction of the UV-curing adhesives 5a and 5b similarly to FIG. 3(c). Furthermore, similarly to FIGS. 4(a) and 4(b), at the time of high temperature and low temperature, the tight contact between the chassis 301 and the holder 302 can be kept by utilizing thermal expansion and contraction of the UV-curing adhesives 5a and 5b. Thus, similarly to the configuration of the first embodiment, there is an effect that a position shift on the submicron order can be prevented also in a temperature cycle test in addition to the initial stage of assembling. Furthermore, the chassis and the holder are made contact with each other at specific surfaces invariably through the assembling and reliability test (temperature cycle). Therefore, a fixing structure of an optical component that achieves also enhancement in the heat release performance in addition to prevention of a position shift can be provided. Moreover, because only the adhesive is used as the constituent element other than the chassis and the holder, a pressing component formed of a spring or the like is unnecessary. Thus, there is also an effect that the number of components is decreased and the material cost, the assembling cost, and so forth are reduced.

In the above-described first to third embodiments of the present invention, the laser diode (LD) is employed as an example of the optical component. However, with a similar configuration, the techniques of the embodiments can be applied also to other optical components such as a light receiving element.

Furthermore, as the material of the chassis and the holder, a die-cast component of a metal such as Zn, Mg, or Al will be mainly available. However, if the heat release performance is not so required like in a configuration with a light receiving element, it will also be possible that they are made of a resin.

Moreover, whether the UV-curing adhesive is an acrylic adhesive or an epoxy adhesive, effects can be similarly achieved.

What is claimed is:

1. A fixing structure of an optical component for fixing an optical component to a device chassis, the fixing structure comprising:
   a device chassis on which the optical component is mounted, the device chassis having a joint part in which a U-groove and a plurality of through-holes around the U-groove are formed;
   a holder holding the optical component that has an optical axis aligned to form a predetermined angle with a holder reference surface and is bonding-fixed by a resin, a first plate part and a second plate part for joint to the device chassis and a connecting part that connects the first plate part to the second plate part being formed in the holder, a plurality of joint holes being formed in the second plate part, the connecting part of the holder being fitted into the U-groove of the joint part of the device chassis; and
   an adhesive that is extended in a circular columnar shape and is made by inserting the connecting part of the holder into the U-groove of the joint part of the device chassis, and positioning the device chassis and the holder in such a manner that the joint holes of the second plate part are opposed to the through-holes of the device chassis, and applying a UV-curing adhesive in such a manner that the UV-curing adhesive is bonded to the first plate part of the holder and is continuous to the inside of the joint hole via the inside of the through-hole, and radiating UV light along the center of the through-hole to cure the UV-curing adhesive.

2. A fixing structure of an optical component for fixing an optical component to a device chassis, the fixing structure comprising:
   a device chassis on which the optical component is mounted, the device chassis having a joint part in which a center U-groove and a plurality of penetrating U-grooves around the center U-groove are formed;
   a holder holding the optical component that has an optical axis aligned to form a predetermined angle with a holder reference surface and is bonding-fixed by a resin, a first plate part and a second plate part for joint to the device chassis and a connecting part that connects the first plate part to the second plate part being formed in the holder, a plurality of joint holes being formed in the second plate part, the connecting part of the holder being fitted into the center U-groove of the joint part of the device chassis; and
   an adhesive that is extended in a columnar shape and is made by inserting the connecting part of the holder into the center U-groove of the joint part of the device chassis, and positioning the device chassis and the holder in such a manner that the joint holes of the second plate part are opposed to the penetrating U-grooves of the device chassis, and applying a UV-curing adhesive in such a manner that the UV-curing adhesive is bonded to the first plate part of the holder and is continuous to the inside of the joint hole via the inside of the penetrating U-groove, and radiating UV light along the center of the penetrating U-groove to cure the UV-curing adhesive.

3. A fixing structure of an optical component for fixing an optical component to a device chassis, the fixing structure comprising:
   a holder holding the optical component that has an optical axis aligned to form a predetermined angle with a holder reference surface and is bonding-fixed by a resin, the holder having a joint plate part formed on a holder main body part to which the optical component is bonding-fixed, a plurality of holder through-holes being formed in the joint plate part;
   a device chassis on which the optical component is mounted, the device chassis having a joint part in which a first plate part and a second plate part for sandwiching the joint plate part of the holder to join the holder to the device chassis are formed, a U-groove into which the holder main body part is fitted being formed in the first plate part and the second plate part, a plurality of joint holes being formed in the second plate part; and
   an adhesive that is extended in a circular columnar shape and is made by inserting the holder main body part into the U-groove of the joint part of the device chassis, and positioning the device chassis and the holder in such a manner that the holder through-holes of the joint plate part inserted between the first plate part and the second plate part are opposed to the joint holes of the second plate part of the device chassis, and applying a UV-curing adhesive in such a manner that the UV-curing adhesive is bonded to the first plate part and is continuous to the inside of the joint hole via the inside of the holder through-hole, and radiating UV light along the center of the holder through-hole to cure the UV-curing adhesive.

4. The fixing structure of an optical component according to claim 1, wherein
   when the connecting part of the holder is inserted into the U-groove of the joint part of the device chassis and the device chassis and the holder are positioned in such a manner that the joint holes of the second plate part are opposed to the through-holes of the device chassis, a gap with a length of t1 is formed between the first plate part of the holder and the through-holes of the device chassis and a gap with a length of t2 is formed between the through-holes of the device chassis and the joint holes of the second plate part of the holder, and
   a condition of (Expression 1) is satisfied $$t2<t1. \tag{Expression 1}$$

5. The fixing structure of an optical component according to claim 4, wherein
   if distance from an end of the joint hole closer to the device chassis to an open end of the adhesive in the joint hole is t3, a condition of (Expression 2) is further satisfied $$t1<t2+t3. \tag{Expression 2}$$

6. The fixing structure of an optical component according to claim 2, wherein
   when the connecting part of the holder is inserted into the center U-groove of the joint part of the device chassis and the device chassis and the holder are positioned in such a manner that the joint holes of the second plate part are opposed to the penetrating U-grooves of the device chassis, a gap with a length of t1 is formed between the first plate part of the holder and the penetrating U-grooves of the device chassis and a gap with a length of t2 is formed between the penetrating U-grooves of the device chassis and the joint holes of the second plate part of the holder, and a condition of (Expression 1) is satisfied $$t2<t1. \qquad \text{(Expression 1)}$$

7. The fixing structure of an optical component according to claim 6, wherein if distance from an end of the joint hole closer to the device chassis to an open end of the adhesive in the joint hole is t3, a condition of (Expression 2) is further satisfied $$t1<t2+t3. \qquad \text{(Expression 2)}$$

8. The fixing structure of an optical component according to claim 1, wherein
the optical component bonding-fixed to the holder by the resin is a laser diode and a lens, and a sub-assembly of the holder is a lens-equipped laser diode that emits a light beam.

9. The fixing structure of an optical component according to claim 2, wherein
the optical component bonding-fixed to the holder by the resin is a laser diode and a lens, and a sub-assembly of the holder is a lens-equipped laser diode that emits a light beam.

10. The fixing structure of an optical component according to claim 3, wherein
the optical component bonding-fixed to the holder by the resin is a laser diode and a lens, and a sub-assembly of the holder is a lens-equipped laser diode that emits a light beam.

11. The fixing structure of an optical component according to claim 1, wherein
the optical component bonding-fixed to the holder by the resin is a light receiving element and a lens, and a sub-assembly of the holder is a lens-equipped light receiving element that receives a light beam.

12. The fixing structure of an optical component according to claim 2, wherein
the optical component bonding-fixed to the holder by the resin is a light receiving element and a lens, and a sub-assembly of the holder is a lens-equipped light receiving element that receives a light beam.

13. The fixing structure of an optical component according to claim 3, wherein
the optical component bonding-fixed to the holder by the resin is a light receiving element and a lens, and a sub-assembly of the holder is a lens-equipped light receiving element that receives a light beam.

14. A fixing method of an optical component for fixing an optical component to a device chassis, the fixing method comprising:
aligning an optical axis of the optical component relative to a holder in which a first plate part and a second plate part for joint to the device chassis and a connecting part that connects the first plate part to the second plate part are formed and a plurality of joint holes are formed in the second plate part so that the optical axis forms a predetermined angle with a holder reference surface, and bonding-fixing the optical component by a resin;
inserting the connecting part of the holder into a U-groove formed in a joint part of the device chassis and positioning the device chassis and the holder in such a manner that the joint holes of the second plate part are opposed to a plurality of through-holes formed around the U-groove of the device chassis;
applying a UV-curing adhesive in such a manner that the UV-curing adhesive is bonded to the first plate part of the holder and is continuous to the inside of the joint hole via the inside of the through-hole; and
radiating UV light from the outside of the joint hole along the center of the through-hole to cure the UV-curing adhesive.

15. The fixing method of an optical component according to claim 14, wherein
a plurality of penetrating U-grooves are formed instead of the plurality of through-holes formed around the U-groove of the device chassis, and
the fixing method includes
inserting the connecting part of the holder into a center U-groove formed in the joint part of the device chassis and positioning the device chassis and the holder in such a manner that the joint holes of the second plate part are opposed to the plurality of penetrating U-grooves formed around the center U-groove of the device chassis;
applying the UV-curing adhesive in such a manner that the UV-curing adhesive is bonded to the first plate part of the holder and is continuous to the inside of the joint hole via the inside of the penetrating U-groove; and
radiating UV light from the outside of the joint hole along the center of the penetrating U-groove to cure the UV-curing adhesive.

16. An optical pick-up device comprising
an optical pick-up case including a first LD module, a second LD module, a prism, a reflective mirror, an actuator, an objective lens, a lens, and a light receiving element module,
wherein
in a structure to fix at least one module of the first and second LD modules and the light receiving element module to the optical pick-up case,
the module has a configuration obtained by aligning an optical axis of an optical component relative to a holder in which a first plate part and a second plate part for joint to the optical pick-up case and a connecting part that connects the first plate part to the second plate part are formed and a plurality of joint holes are formed in the second plate part so that the optical axis forms a predetermined angle with a holder reference surface and bonding-fixing the optical component by a resin, and
the module is bonding-fixed to the optical pick-up case by an adhesive that has a circular columnar shape and is made by inserting the connecting part of the holder of the module into a U-groove formed in a joint part of the optical pick-up case, and positioning the optical pick-up case and the holder in such a manner that the joint holes of the second plate part are opposed to a plurality of through-holes formed around the U-groove of the optical pick-up case, and applying a UV-curing adhesive in such a manner that the UV-curing adhesive is bonded to the first plate part of the holder and is continuous to the inside of the joint hole via the inside of the through-hole, and radiating UV light along the center of the through-hole to cure the UV-curing adhesive.

17. A module device with light sources of RGB three primary colors, comprising an RGB module case including LD modules of red, green, and blue, a first combining mirror, a second combining mirror, and a bidirectional tilting mirror, wherein in a structure to fix at least one module of the LD modules of red, green, and blue to the RGB module case, the module has a configuration obtained by aligning an optical axis of an optical component relative to a holder in which a first plate part and a second plate part for joint to the RGB module case and a connecting part that connects the first plate part to the second plate part are formed and a plurality of joint holes are formed in the second plate part so that the optical axis forms a predetermined angle with a holder reference surface and bonding-fixing the optical component by a resin, and the module is bonding-fixed to the RGB module case by an adhesive that has a circular columnar shape and is made by inserting the connecting part of the holder of the module into a U-groove formed in a joint part of the RGB module case, and positioning the RGB module case and the holder in such a manner that the joint holes of the second plate part are opposed to a plurality of through-holes formed around the U-groove of the RGB module case, and applying a UV-curing adhesive in such a manner that the UV-curing adhesive is bonded to the first plate part of the holder and is continuous to the inside of the joint hole via the inside of the through-hole, and radiating UV light along the center of the through-hole to cure the UV-curing adhesive.

* * * * *